(12) United States Patent
Driver (10) Patent No.: US 7,112,254 B1
(45) Date of Patent: Sep. 26, 2006

(54) INSTALLATION OF CURED IN PLACE LINER WITH INNER IMPERMEABLE LAYER AND APPARATUS

(75) Inventor: Franklin Thomas Driver, St. Charles, MO (US)

(73) Assignee: Insituform (Netherlands) B.V., Rotterdam (NL)

( * ) Notice: Subject to any disclaimer, the term of this patent is extended or adjusted under 35 U.S.C. 154(b) by 84 days.

(21) Appl. No.: 10/704,274

(22) Filed: Nov. 7, 2003

(51) Int. Cl.
*B32B 37/00* (2006.01)
*B29C 65/00* (2006.01)
*F16L 55/18* (2006.01)

(52) U.S. Cl. ............... 156/285; 156/287; 156/293; 156/294; 138/97; 405/150.1

(58) Field of Classification Search ............ 264/36.15, 264/36.16, 36.17
See application file for complete search history.

(56) References Cited

U.S. PATENT DOCUMENTS

| | | | |
|---|---|---|---|
| 3,533,133 A | 10/1970 | Meitinger | |
| 3,737,261 A | 6/1973 | Hardesty | |
| 4,009,063 A | 2/1977 | Wood | |
| 4,064,211 A | 12/1977 | Wood | |
| 4,135,958 A | 1/1979 | Wood | |
| 4,182,262 A | 1/1980 | Everson et al. | |
| 4,366,012 A | 12/1982 | Wood | |
| 4,456,401 A | 6/1984 | Williams et al. | |
| 4,714,095 A | 12/1987 | Muller et al. | |
| 4,786,345 A | 11/1988 | Wood et al. | |
| 4,986,951 A * | 1/1991 | Ledoux et al. ............... | 264/516 |
| 5,653,555 A | 8/1997 | Catallo | |
| 5,778,938 A | 7/1998 | Chick et al. | |
| 6,270,259 B1 | 8/2001 | Burton | |
| 6,270,289 B1 | 8/2001 | Einhaus et al. | |
| 6,539,979 B1 | 4/2003 | Driver | |
| 6,612,340 B1 | 9/2003 | Lause | |
| 6,942,426 B1 * | 9/2005 | Kampbell et al. ....... | 405/184.2 |
| 2003/0015247 A1 | 1/2003 | Driver et al. | |
| 2003/0113489 A1 | 6/2003 | Smith | |

FOREIGN PATENT DOCUMENTS

| | | |
|---|---|---|
| DE | 4113002 A1 | 10/1992 |
| EP | 0 403 133 A | 12/1990 |

(Continued)

OTHER PUBLICATIONS

International Search Report (PCT/US2004/036625).

(Continued)

*Primary Examiner*—Richard Crispino
*Assistant Examiner*—Justin Fischer
(74) *Attorney, Agent, or Firm*—Greenberg Traurig, LLP; Michael I. Wolfson (57) ABSTRACT

A method for installation of a resin impregnated cured in place liner with an inner impermeable layer is provided. The liner is formed from a resin impregnable material having an impregnable layer bonded thereto. The material is formed into tubular shape with the impermeable layer on the outside of the tube about a tubular forming member and continuously everted into the tubular forming device to place the impermeable layer on the inside. An outer impermeable wrapping can be applied after wetting out the inner tubular member. A pull-in fitting with a steam connection is inserted into the leading end of the liner and the liner is pulled to an installation access. Prior to reaching the installation access a receiving canister with steam connection is attached to the end of the liner and pull-in completed. This permits inflation of the pulled in liner with an air curing of the resin with steam. All steaming is done below grade with minimal entry to underground access points.

17 Claims, 7 Drawing Sheets

FOREIGN PATENT DOCUMENTS

| | | |
|---|---|---|
| EP | 0 542 639 A | 5/1993 |
| GB | 1601234 A | 10/1981 |
| RU | 2097196 C1 | 11/1997 |
| WO | WO 90/11175 A | 10/1990 |
| WO | WO 91/18234 A | 11/1991 |
| WO | WO 98/31964 A | 7/1998 |
| WO | WO 01/77569 A | 10/2001 |
| WO | WO 02/064351 A | 8/2002 |
| WO | WO 03/038331 A | 5/2003 |
| WO | WO 03/069211 A | 8/2003 |

OTHER PUBLICATIONS

International Search Report (PCT/US2004/036633).
International Search Report (PCT/US2004/036629).
International Search Report (PCT/US2004/036621).
International Search Report (PCT/US2004/036628).

* cited by examiner

INSTALLATION OF CURED IN PLACE LINER WITH INNER IMPERMEABLE LAYER AND APPARATUS

BACKGROUND OF THE INVENTION

This invention relates to trenchless rehabilitation of existing conduits and pipelines, and more particularly to installation of cured in place liners having an inner impermeable layer by pulling in and inflating.

It is generally well known that existing conduits and pipelines, particularly underground pipes, such as sanitary sewer pipes, storm sewer pipes, water lines and gas lines that are employed for conducting fluids frequently require repair due to fluid leakage. The leakage may be inward from the environment into the interior or conducting portion of the pipelines. Alternatively, the leakage may be outward from the conducting portion of the pipeline into the surrounding environment. In either case of infiltration or exfultration, it is desirable to avoid this type of leakage.

The leakage in the existing conduit may be due to improper installation of the original pipeline, or deterioration of the pipe itself due to normal aging, or the effects of conveying corrosive or abrasive material. Cracks at, or near pipe joints may be due to environment conditions such as earthquakes, or the movement of large vehicles on the overhead surface, or similar natural or man-made vibrations, or other such causes. Regardless of the cause, such leakages are undesirable and may result in waste of the fluid being conveyed within the pipeline, or result in damage to the surrounding environment and possible creation of dangerous public health hazards. If the leakage continues it can lead to structural failure of the existing conduit due to loss of soil and side support of the conduit.

Because of ever increasing labor and machinery costs, it is increasingly more difficult and less economical to repair underground pipes or portions that may be leaking by digging up the existing pipe and replacing the pipe with a new one. As a result, various methods have been devised for the in place repair or rehabilitation of existing pipelines. These new methods avoid the expense and hazards associated with digging up and replacing the pipe or pipe sections, as well as the significant inconvenience to the public during construction. One of the most successful pipeline repair or trenchless rehabilitation processes that is currently in wide use is called the Insituform® Process. The Insituform Process is described in detail in U.S. Pat. No. 4,009,063, U.S. Pat. No. 4,064,211 and U.S. Pat. No. 4,135,958, the contents of which are all incorporated herein by reference.

In the standard practice of the Insituform Process an elongated flexible tubular liner of a felt fabric, foam or similar resin impregnable material with an outer impermeable coating that has been impregnated with a thermosetting curable resin is installed within the existing pipeline. In the most widely practiced embodiment of that process, the liner is installed utilizing an eversion process, as described in the '211 and '958 Insituform patents. In the eversion process, radial pressure applied to the interior of an everted liner presses it against and into engagement with the inner surface of the pipeline as the liner unfolds along the length of the pipeline. The Insituform Process is also practiced by pulling a resin impregnated liner into the conduit by a rope or cable and using a separate fluid impermeable inflation bladder or tube that is everted within the liner to cause the liner to cure against the inner wall of the existing pipeline. Such resin impregnated liners are generally referred to as "cured-in-place-pipes" or "CIPP liners" and the installation is referred to a CIPP installation.

Conventional cured in place flexible tubular liners for both the eversion and pull-in-and-inflate CIPP installations have an outer smooth layer of relatively flexible, substantially impermeable polymer coating in its initial state. The outer coating allows a resin to be impregnated into the inner layer of resin impregnable material, such as felt. When everted, this impermeable layer ends up on the inside of the liner with the resin impregnated layer against the wall of the existing pipeline. As the flexible liner is installed in place within the pipeline, the pipeline is pressurized from within, preferably utilizing an eversion fluid, such as water or air to force the liner radially outwardly to engage and conform to the interior surface of the existing pipeline. Cure of the resin is initiated by introduction of hot curing fluid, such as water into the everted liner through a recirculation hose attached to the end of the everting liner. The resin impregnated into the impregnable material then cures to form a hard, tight fitting rigid pipe lining within the existing pipeline. The new liner effectively seals any cracks and repairs any pipe section or pipe joint deterioration in order to prevent further leakage either into or out of the existing pipeline. The cured resin also serves to strengthen the existing pipeline wall so as to provide added structural support for the surrounding environment.

When tubular cured in place liners are installed by the pull-in-and-inflate method, the liner is impregnated with resin in the same manner as in the eversion process and pulled into and positioned within the existing pipeline in a collapsed state. In a typical installation, a downtube, inflation pipe or conduit having an elbow at the lower end is positioned within an existing manhole or access point and an everting bladder is passed through the downtube, opened up and cuffed back over the mouth of the horizontal portion of the elbow and inserted into the collapsed liner. The collapsed liner within the existing conduit is then positioned over and secured to the cuffed back end of the inflation bladder. An everting fluid, such as water, is then fed into the downtube and the water pressure causes the inflation bladder to push out of the horizontal portion of the elbow and cause the collapsed liner to expand against the interior surface of the existing conduit. The eversion of the inflation bladder continues until the bladder reaches and extends into the downstream manhole or second access point. At this time the liner pressed against the interior surface of the existing conduit is allow to cure. Cure is initiated by introduction of hot curing water introduced into the inflation bladder in much the same manner as the recirculation line tied to the end of the everting bladder to cause the resin in the impregnated layer to cure.

After the resin in the liner cures, the inflation bladder may be removed or left in place in the cured liner. Both the pull-in and inflate method as well as the eversion method typically require man-access to restricted manhole space on several occasions during the process. For example, man-access is required to secure the everting liner or bladder to the end of the elbow and insert it into the collapsed liner.

Regardless of how the liner is to be installed a curable thermosetting resin is impregnated into the resin absorbent layers of a liner by a process referred to as "wet out." The wet-out process generally involves injecting resin into resin absorbent layers through an end or an opening formed in the outer impermeable film, drawing a vacuum and passing the impregnated liner through nip rollers as is well known in the lining art. A wide variety of resins may be used, such as polyester, vinyl esters, epoxy resins and the like, which may be modified as desired. It is preferable to utilize a resin which is relatively stable at room temperature, but which cures readily when heated with air, steam or hot water, or subjected to appropriate radiation, such as ultra-violet light.

One such procedure for wetting out a liner by vacuum impregnation is described in Insituform U.S. Pat. No. 4,366,012. When the liner has inner and outer impermeable layers, the tubular liner may be supplied flat and slits formed on opposite sides of the flattened liner and resin injected and on both sides as described in the '063 patent. Another apparatus for wetting out at the time of installation while drawing a vacuum at the trailing end of the liner is shown in U.S. Pat. No. 4,182,262. The contents of each of these patents are incorporated herein by reference.

Recent efforts have been made to modify the pull-in and inflate method to utilize air to evert a bladder into the pulled-in liner from a proximal access point as described in U.S. Pat. No. 6,539,979 and application publication No. 2003/0015247 A1, the contents of which are incorporated herein by reference. When the everting bladder reaches the distal access point, steam is introduced into the proximal access point to initiate cure of the resin impregnated into the resin impregnable layer. This process offers the advantage of faster cure due to the increased energy carried by the steam as the curing fluid. However, the process still requires eversion of a bladder into the pulled-in impregnated liner.

Efforts to avoid this step of everting the bladder into the pulled-in liner include performing the eversion step above ground. For example, in U.S. Pat. No. 6,270,289, the process includes everting a calibration hose into a flat-lying lining hose above ground prior to pulling the hose assembly into the existing conduit. This process avoids the eversion below grade, but is severely limited into the length of lining that can be laid out above ground prior to pulling-in.

A further suggestion to avoid this eversion is to manufacture a liner having an inner coating and an outer coating so that a curing fluid can be introduced directly into a pulled-in liner. The disadvantages here involves the difficulty faced when trying to impregnate the resin impregnable material disposed between the inner and outer impermeable coatings. The outer coating remains essential for handling the impregnated liner and to allow the liner to be pulled into the existing conduit and the inner coating is desired to all for curing with the steam.

Notwithstanding the modifications to both the eversion and pull-in and inflate trenchless rehabilitation methods, both processes are labor intensive, require an eversion step and suffer from the increased costs associated with this. Accordingly, it is desirable to provide a method of trenchless rehabilitation that reduces cycle time and manhole entry and uses steam as the curing fluid to take advantage of the energy available to provide an installation method which is safer, faster and more efficient economically than current rehabilitation methods.

SUMMARY OF THE INVENTION

Generally speaking, in accordance with the invention, a method for installation of a resin impregnated cured in place liner with an inner impermeable layer suitable for rehabilitation of existing pipelines utilizing steam to cure the resin is provided. In a preferred embodiment, the liner may have an integral inner impermeable layer and be wrapped with additional layers of resin absorbent material with an outer impermeable coating or film. The resin absorbent material is impregnated with a thermosetting resin.

The cured in place liner impregnated with a thermosetting resin generally is delivered to the installation site in continuous lengths. A pulling head is installed and the liner is pulled-in to the existing conduit from a tube feed receiving access to an installation access, the upstream access. When the liner is pulled-in to a fixed distance from the installation access, the liner is cut from the supply and a receiving canister is inserted into the trailing end of the liner. The pull-in of the liner is continued until the receiving canister rests in the receiving access and the pull-in fitting is located within the installation access.

Fluid connection is made to the pull-in fitting. The liner is then expanded with air and cured with low-pressure steam fed into the pull-in fitting. The receiving canister includes a discharge port for condensate and an exhaust manifold to control air, steam and air/steam mixture that flows through the liner is positioned adjacent to the receiving access. Once cure is complete, air is used to cool the liner. The ends are removed and service is reinstated. The installation is completed with steam introduced underground and minimal entry into underground access points.

Accordingly, it is an object of the invention to provide an improved method of cured-in-place rehabilitation of existing pipelines.

Another object of the invention is to provide an improved equipment for the installation of a cured in place liner to be cured with steam.

A further object of the invention is to provide an improved method of installation of a cured in place liner with an inner impermeable layer suitable for use of steam to cure the liner.

Yet another object of the invention is provide an improved method of installation of a cured in place liner involving minimal or no manhole entry.

Still other objects and advantages of the invention will in part be obvious and will in part be apparent from the specification.

The invention accordingly comprises the several steps and the relation of one or more of such steps with respect to each of the others, the apparatuses embodying features of construction, combinations and arrangement of parts that are adapted to effect such steps, and the products that possess the characteristics, features, properties, and the relation of components, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawing(s), in which.

DESCRIPTION OF THE PREFERRED EMBODIMENTS

A resin impregnated cured in place liner to be installed in accordance with the invention has an internal impermeable lining so that it can be installed by the pull-in-and-inflate method and inflated and cured with a heated fluid without the use of a separately installed inflation bladder. The impregnated liner with inner impermeable layer may be prepared continuously in desired lengths. The liner may be impregnated as it is assembled in view of the increased effort necessary to impregnate a flattened liner having a resin absorbent material between an inner impermeable layer and an outer impermeable coating using convention vacuum impregnation technology as discussed in U.S. Pat. No. 6,270,289. In any event, a liner as described in this patent may be installed by the method described herein.

Figure 1:
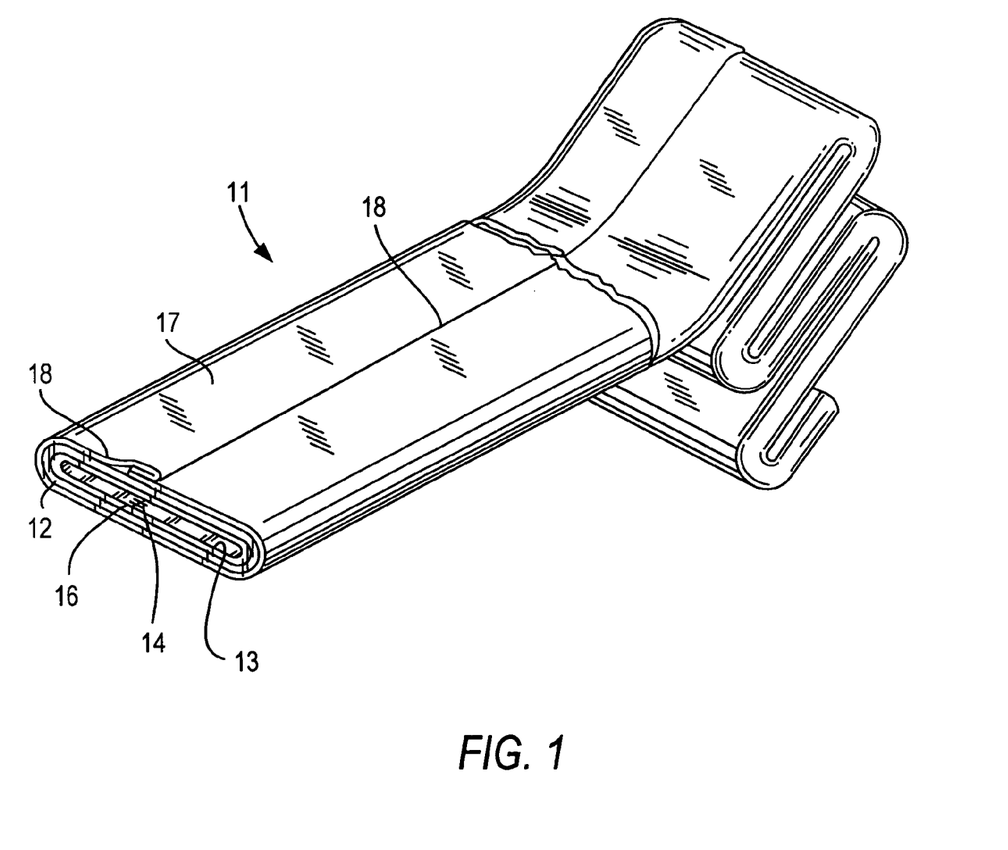
FIG. 1 is a perspective view of a length of a resin impregnated cured in place liner having an inner impermeable coating and outer impermeable wrapping suitable for use in lining an existing pipeline in accordance with the invention.
Figure 6:
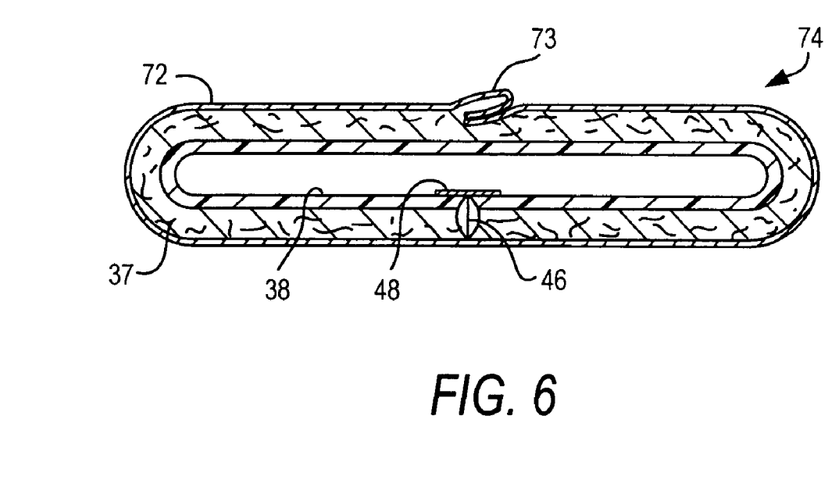
FIG. 6 is a cross-sectional view of the impregnated liner prepared by the apparatus of FIG. 4.

FIG. 1 illustrates a flexible cured in place liner 11 of the type utilized in the method of installation in accordance with the invention. Liner 11 is formed from at least one layer of a flexible resin impregnable material, such as a felt layer 12 in tubular form having an integral inner impermeable polymer film layer 13. Felt layer 12 and film layer 13 are stitched along a seam line 14 to form tubular liner 11. A compatible thermoplastic film in a form of a tape or extruded material 16 is placed on or extruded over seam line 14 in order to ensure the impermeability of the interior of liner 11. Liner 11 may include an outer second felt layer also stitched along a seam line that would be positioned at a point in the tube other than the location of seam line 14 in inner felt layer 12. Liner 11 is then wrapped with an outer impermeable wrapping 17 formed into a tube with a heat sealed longitudinal joint 18. This structure is shown in more detail in the cross-section of a liner 74 in FIG. 6.

Continuous lengths of liner 11 may be manufactured as described in connection FIG. 2. After resin impregnable layer 12 is impregnated with a thermosetting resin, finished and impregnated liner 11 is stored in a refrigeration unit in continuous lengths to suppress premature cure of the resin. Liner 11 is cut to a desired length as it is being pulled into the existing pipeline in accordance with the method described below.

Integral inner layer 13 of liner 11 illustrated in FIG. 1 is impermeable to water and air. This will allow use of air to inflate the pulled in liner and steam for cure. In a pull in and inflate installation in accordance with the invention, outer coating 17 of liner 11 need only be sufficiently impermeable for retention of resin and to prevent damage to liner 11 as it is pulled into the existing pipeline. Outer coating 17 is generally applied after resin impregnation and does not form part of the final laminate after cure. This allows any air or gases trapped in impregnated felt layer 12 and any additional impregnated layers to escape and remain inside of outer coating 17. The fact that coating layer 17 is not bonded to an impregnable layer lets it move away from that layer without causing delamination between layers. When the outer-coated layer is integral to the felt layer delamination may occur at services, an area where the liner is unsupported.

For larger liner diameters, several layers of felt or resin impregnable material may be used. Felt layer 12 may be a natural or synthetic flexible resin absorbable material, such as polyester, acrylic polypropylene, or inorganic fibers such as glass and carbon. Alternatively, the resin absorbent material may be a foam. Impermeable inner layer 13 may be a polyolefin, such as polyethylene or polypropylene, a vinyl polymer, such as polyvinyl chloride, or a polyurethane as is well known in the art. Any form of sewing, adhesive bonding or flame bonding, or any other convenient means can be used to join the material into tubes. In the initial step in all trenchless rehabilitation installations, the existing pipeline is prepared by cleaning and videotaping.

Figure 4:
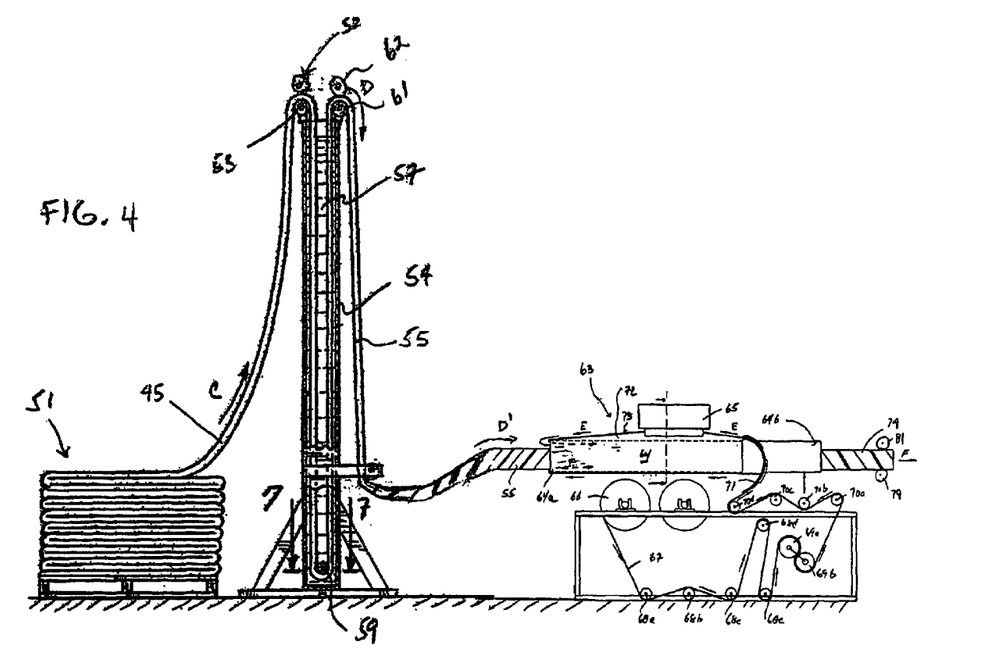
FIG. 4 is a schematic in elevation showing a resin impregnation tower and tube sealing and wrapping apparatus for applying an outer impermeable layer constructed and arranged in accordance with the invention.
Figure 5:
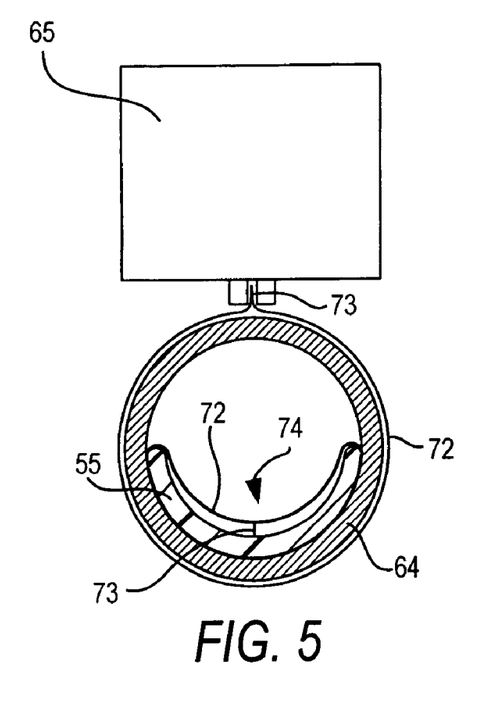
FIG. 5 is a cross-section of the edge sealer in the tube sealing and wrapping apparatus taken along line 5—5 of FIG. 4.

Felt layer 12 may be impregnated in the usual manner using vacuum. Alternatively, felt layer 12 is impregnated with resin during assembly of liner 11 and then outer impermeable wrapping 18 is applied. This avoids the difficulty with impregnating a finished liner having felt layers between an inner and outer impregnable layers. In U.S. Pat. No. 4,009,063, Eric Wood proposed injecting resin in the felt layer using needles inserted into opposite sides of a flattened constructed liner. This operation requires cutting and patching needle holes in the outer coating. The vacuum impregnation process taught in U.S. Pat. No. 4,366,012 would not be practical unless the vacuum is drawn on both sides as the inner coating is a barrier to resin flow in a liner with inner and outer coating. In order to overcome these impregnation difficulties, liner 11 is manufactured from endless rolls of flat coated and plain felt and continuously impregnated prior to application of an outer wrapping as illustrated in FIGS. 2, 4 and 5.

While felt layers are formed into tubes by stitching and/or taping, any of the conventionally known methods for forming felt or other resin impregnable material into tubes is suitable. For example, tubes can be formed by use of various glues or adhesives as well as flame bonding. Tape may be applied to felt layer 12 and inner impermeable layer 13 by applying an adhesive strip, extruding a layer of polymeric material, or heat fusing the tape in order to seal the butted edges of the felt material and the holes formed during a sewing operation.

Figures 2, 3:
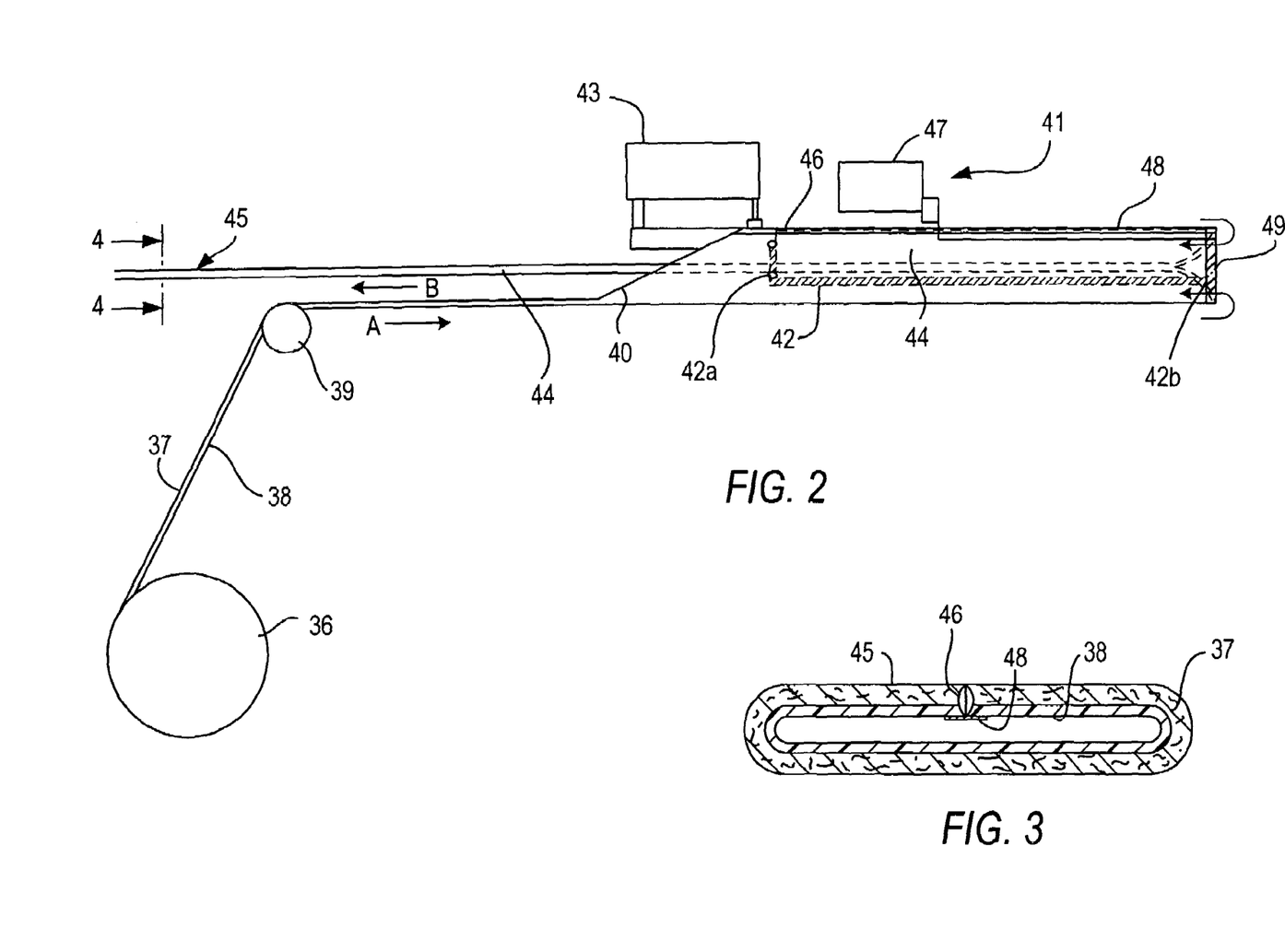
FIG. 2 is a schematic view of the apparatus used for preparing the inner portion of the liner having an outer felt layer with an integral inner high temperature polymeric layer used in connection with preparation of the cured in place liner of FIG. 1.
FIG. 3 is a cross-sectional view showing the structure of the inner tubular portion of the liner produced by the apparatus of FIG. 2.

Referring now to FIG. 2, a method for continuously forming a length of a tube of resin impregnable material with a sealed inner layer of impermeable material is shown. A roll of coated felt 36 having an endless length of felt 37 with an impermeable layer 38 is fed over a directional roller 39 in flat form with coated side facing roller 39 to a tube-forming device 41.

Tube forming device 41 includes a tubular support frame 42 having a proximal end 42a and a distal end 42b and a film deformer 40. A seaming device 43 that may be a sewing and taping machine, gluing machine or flame bonding apparatus is mounted above support frame 42. Felt 37 with impermeable layer 38 facing roller 39 is fed in the direction of an arrow A to the proximal end of tube forming device 41 where it is deflected by deflector 40 and wrapped around support frame 42 and seamed into a tube 44 along a seam line 46 with felt 37 on the inside and impermeable layer 38 on the outside. Tube 44 then passes a taping device 47 where a tape 48 is placed over seam line 46 to form an impermeable coated taped tube member 45.

Taped tube member 45 then continues to travel along tubular support frame 42 to an inverter ring 49 at distal end 42b of support frame 42. Taped tube member 45 is then everted into tubular support frame 42 so that impermeable layer 38 is now on the inside of tube 45 as it is withdrawn from proximal end 42a of tubular support frame 42 along a line defined by an arrow B. At this point everted tube 45 has the structure illustrated in cross-section in FIG. 3 with impermeable layer 38 on the inside of tube 45 and felt layer 37 on the outside. Tube 45 then continues to travel in the direction of arrow B for the addition of one or more plain felt layers. Tube 45 is then stored for further use, wrapped with an outer impermeable coating, or may be passed directly to a resin impregnation step as shown on FIG. 4 prior to final wrapping.

FIG. 5 illustrates in schematic the impregnation of a supply 51 of tubular member 45. Here, tube 45 is pulled by a pair of rubber covered pulling rollers 52 and 53 into an open top resin tower 54 filled to a predetermined level with a curable thermoset resin 57 to form an impregnated or wet-out tube 55. Tube 45 passes over roller 53 and down the full height of tower 54 to a bottom roller 59 that turns tube 45 in an upward direction to a pair of compression rollers 61 and 62. Tower 54 is about six to fourteen feet in height, but can be any height sufficient to provide a pressure head sufficient to wet out and impregnate the impregnable layer of tube 45. The height necessary to provide sufficient head to impregnate the impregnable material is dependent on the viscosity of the resin, the thickness of the impregnable material and the speed of feed through the tower. At this time, impregnated tube 55 exiting tower 54 is ready for final wrapping with an outer impermeable coating.

Once at the installation site, impregnated tube 74 having inner impermeable layer 38 and outer impermeable wrapping 72 is ready for installation by the pull-in-and-inflate method. This method is fully described in U.S. Pat. No. 4,009,063, the contents of which are incorporated herein by reference. In the case of installation by the pull-in-and-inflate method, a separate eversion bladder is not necessary to inflate the liner due to the presence of integral inner impermeable layer 38. By proper selection of materials for integral inner impermeable layer 38, such as polypropylene, inflation and curing can be done with steam introduced into the liner 68 once in position in the existing conduit.

Also illustrated in FIG. 4 is a film wrapping and sealing station 63 that includes a former pipe 64 having an inlet end 64a and an outlet end 64b and an edge sealer 65 positioned above the mid-section of former pipe 64. A roll 66 of a resin impermeable film material 67 that is to be wrapped about impregnated tube 55 as it is fed into former pipe 64. Resin impermeable film material 67 is fed from roll 66 about a series of direction rollers 68a–e and pulled by a pair of drive rollers 69a and 69b as film 67 is fed over rollers 70a–d to a former pipe 64. A deflector 71 at outlet end directs film 67 about former pipe 64 prior to being fed into edge sealer 65 to form film 67 into a tube 72 with an edge seal 73 extending outwardly therefrom. Tube 72 of impermeable material moving along former pipe 64 is pulled in a direction indicated by an arrow E to inlet end 64a of former pipe 64 whereupon tube 72 is continuously everted into the interior of former pipe 64 and onto impregnated tube 55 and pulled in the opposite direction indicated by a dashed arrow F.

Referring to FIG. 5, a cross-sectional view through sealer 65 and former pipe 64 along line 4—4 in FIG. 4 is shown. Sealer 65 forms edge seal 73 in film tube 72 as film tube 72 passes over the outside of former pipe 64. Once tube 72 is everted, edge seal 73 is now inside wrapped wet-out tube 74 as it is pulled from outlet end 64b of former pipe 68. Outer impermeable film 72 may be applied prior to or after wet-out. In the case where this is prior to wet out, tube 45 prepared as shown in FIG. 3 is fed directly to tube forming assembly 63 in FIG. 4 and provides liner 74 shown in cross-section in FIG. 6.

Figure 7:
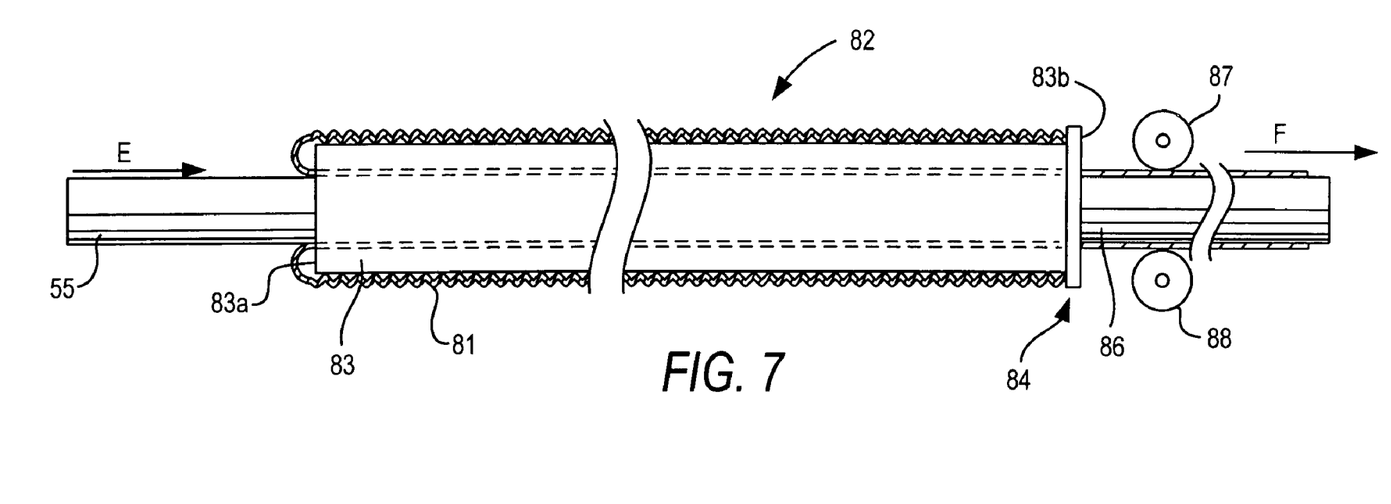
FIG. 7 is a schematic in elevation showing wrapping of the tubular member exiting a resin impregnation apparatus with an outer coating by passing the wet out liner through a tube stuffer having a tubular wrapping stored thereon

A supply of a flexible impermeable tube 81 is loaded onto the outside surface of stuffer pipe 83 having an inlet end 83a and an outlet end 83b. Impregnated tube 55 leaving resin tower 54 is fed into inlet end 83a of stuffer pipe 83. As tube 55 enters inlet end 83a of stuffer pipe 83, impermeable tube 81 is pulled off the outside of stuffer pipe 83 and everted about inlet end 83a into the inside of stuffer pipe 83 to envelope impregnated tube 55 as it leaves outlet end 83b. This forms a complete liner 86 having inner impermeable layer 38 and outer impermeable coating 81. Tube 86 with outer coating 81 is removed from outlet end 83b of stuffer tube 83 by a pair of drive rollers 87 and 88, or other pulling device such as tractors, in a direction of an arrow F. When an extruded tube is used in this embodiment, there is no seam in outer impermeable coating 81. The sole limitation of preparing tube 86 in this manner is the length of impermeable tube 81 that can be placed on stuffer tube 83. It has been found that about 1,000 feet of an impermeable tube can be compressed onto a stuffer tube of about 20 feet in length. Longer lengths can be stored on longer stuffer tubes.

Figure 8:
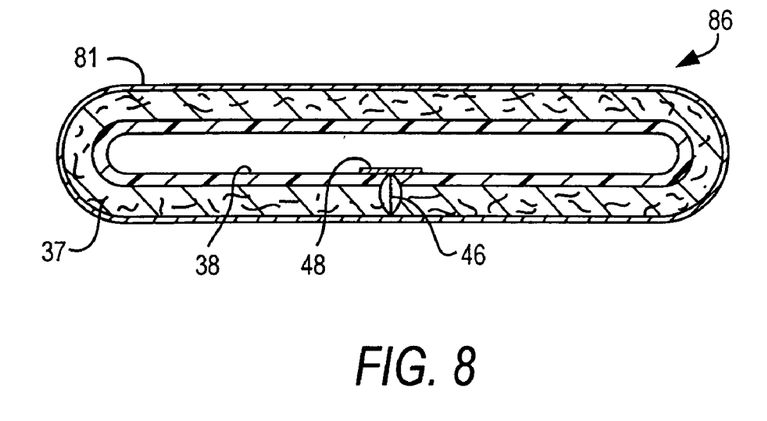
FIG. 8 is a cross-section of a liner wrapped by the apparatus of FIG. 7.

FIG. 8 is cross-section of liner 86 as it exits stuffer tube 83. Liner 86 includes inner tubular member of resin absorbent material 37 having an impermeable inner coating 38 sealed with a tape 48 as described in connection with FIG. 4. After exiting stuffer tube 83, liner 86 includes outer tubular wrapping 81. In view of the fact that tubular wrapping 81 is a previously extruded tube, outer wrapping 81 does not have any seams as in connection with FIGS. 6 and 8.

At the time wet out liner 55 exiting impregnation tower 57 or other wet out apparatus, a longitudinal reinforcing scrim may be added to one surface of lay flat liner 55. The scrim and liner 55 are then fed along arrow D' into former pipe 64 or stuffer pipe 83.

Once at the installation site, impregnated tube 74 having inner impermeable layer 38 and outer impermeable wrapping 72 is ready for installation by the pull-in-and-inflate method. This method is fully described in U.S. Pat. No. 4,009,063, the contents of which are incorporated herein by reference. In the case of installation by the pull-in-and-inflate method, a separate eversion bladder is not necessary to inflate the liner due to the presence of inner impermeable layer 38. By proper selection of materials for inner impermeable layer 38, such as polypropylene, inflation and curing can be done with steam introduced into the liner 74 once in position in the existing conduit.

Figure 9:
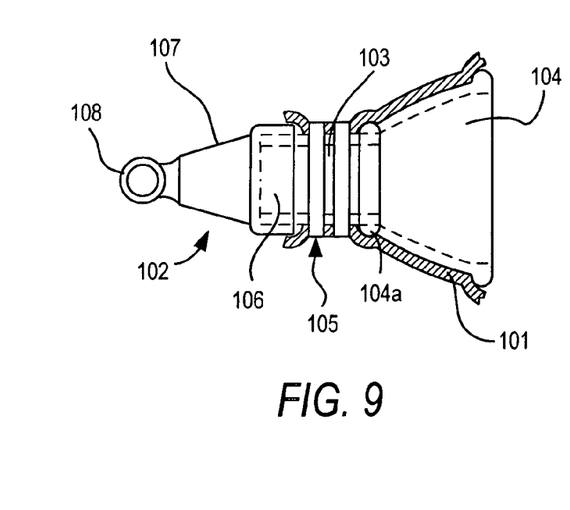
FIG. 9 is an elevational view of the pull-in fitting with a steam thread in accordance with the invention.
Figure 11:
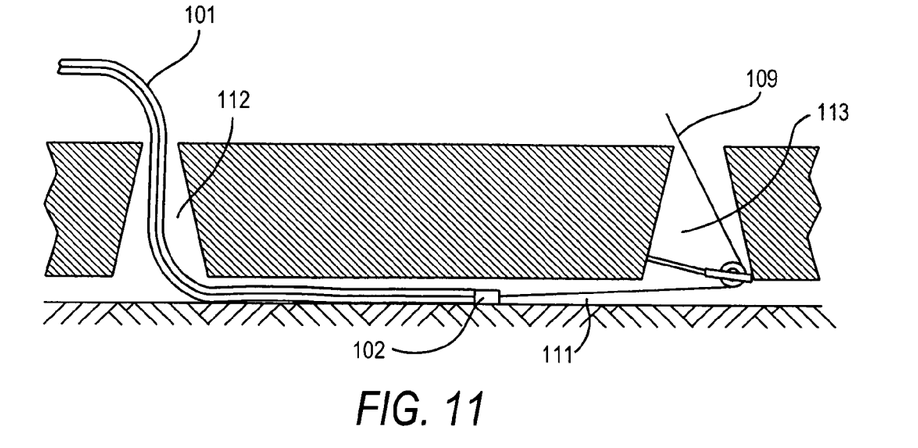
FIG. 11 is a cross-sectional elevational schematic view showing the start of pulling-in of a resin impregnated cured in place liner of the type illustrated in FIG. 1 stored in a refrigerated liner supply vehicle from a downstream or receiving manhole to an upstream or installation manhole at the start of the installation process to line an underground conduit in accordance with the invention.
Figure 12:
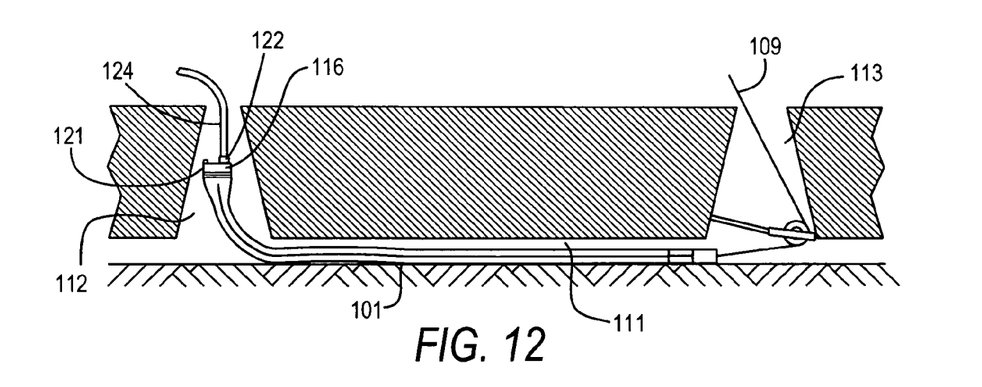
FIG. 12 is a cross-sectional elevational schematic view of the collapsed cured in place liner of FIG. 6 or 8 after a receiving canister is attached to the liner in accordance with the invention.
Figure 13:
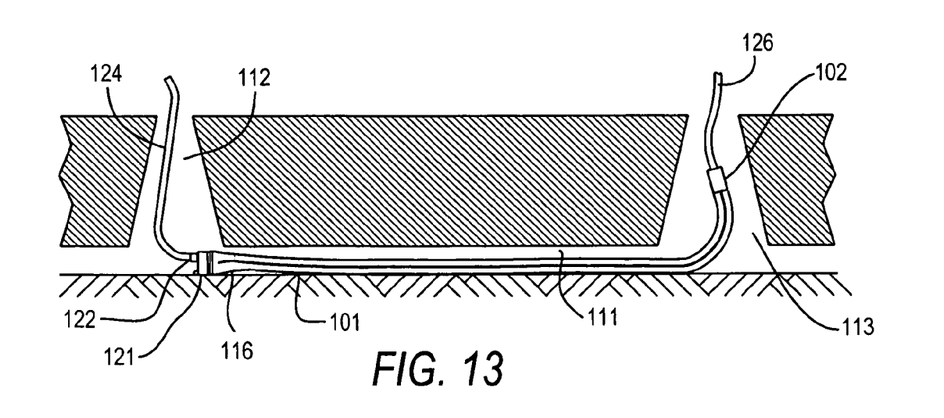
FIG. 13 is a cross-section elevational schematic view of the liner just prior to inflation and cure in accordance with the invention.

An impregnated liner 101 similar to liner 11 of FIG. 1 is installed according to the process in accordance with the invention as illustrated in FIGS. 11 to 13 to be illustrated in more detail below. FIG. 9 illustrates a pull-in fitting 102 for use in the process. Fitting 102 includes a tubular cylindrical section 103 having a flared section 104 with an external rib 104a to aid in banding liner thereto with band 105 for securing liner tube pulling head 102. The forward section of pull-in fitting 102 includes a threaded cone segment 106 for receiving a pulling cap 107 having a pulling eye 108 welded thereto for ease of attachment of a pulling rope or chain. Cap 107 is removable and a steam hose fitting is readily attachable to a threaded section 106 of pulling head 102.

Turning to FIGS. 11 to 13, liner 101 is installed by attaching pulling head 102 to the leading end of liner 101 and secured thereto by steel bands 105. Liner 101 is pulled into an existing conduit 111 having a receiving manhole 112 and an installation manhole 113. Liner 101 is usually pulled in by a rope or cable 109 (shown in FIGS. 11 and 12) with a pulling marker 109a to indicate distance from installation manhole 113. Rope 109 is attached to pulling eye 108 at receiving manhole 112 that is usually the downstream manhole and liner 101 is pulled to installation or upstream manhole 113. However, in view of the fact that the process allows for curing by steam, once liner 101 is in place pressurized fluid and steam can be fed and the liner cured from either manhole.

Figure 10:
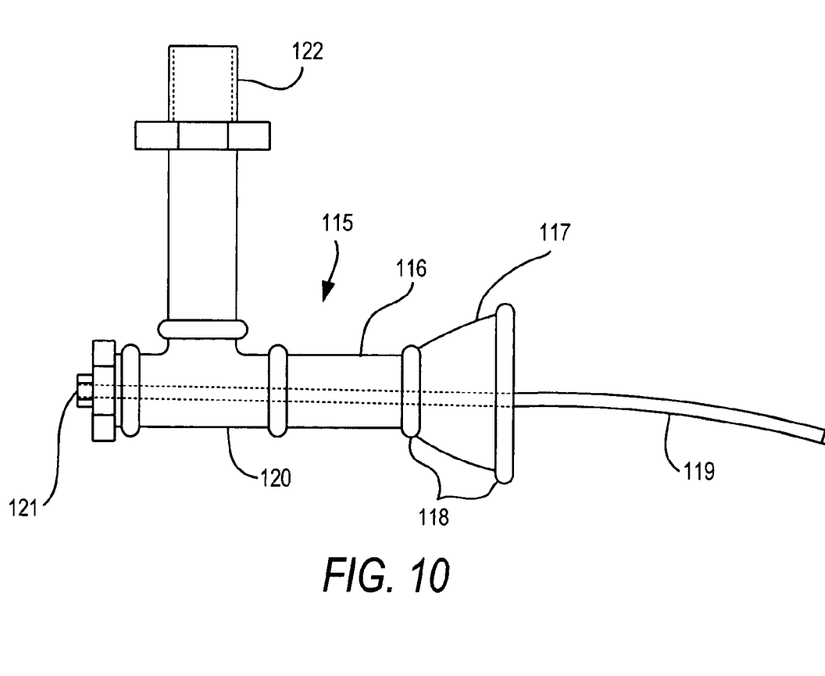
FIG. 10 is an elevational view of a receiving canister, constructed and arranged in accordance with the invention.

Once liner 101 is pulled to within a fixed distance from installation manhole 113 as indicated by marker 109a, for example approximately 15 feet, the pull-in is stopped to allow for installation of a receiving canister 115 to the trailing end of liner 101. Receiving canister 115 is illustrated in detail in FIG. 10. Canister 115 includes a hollow cylindrical section 116 having a cone-shaped leading end 117 with external ribs 118 for securing canister 115 within the trailing end of liner 101. A condensate collector tube 119 extends from leading end 117 of canister 115 into the interior of liner 101. A condensate drain 121 is located at the trailing end of canister 115. Cylindrical section 116 includes an elbow section 120 with a threaded steam fitting 122 for connecting to a steam exhaust hose 124 shown in FIG. 12 to permit coupling canister 115 to an exhaust pipe above ground.

After canister 115 is secured to liner 101, pull-in continues until canister 115 is positioned at the entrance to conduit 111 and receiving manhole 112. At this point, pulling head 102 is within reach of the surface in installation manhole 113. Pull-in cap 107 is removed from pulling head 102 and a steam inlet hose 126 is secured to pulling head 102. Once the trailing end of steam hose 124 is connected to an exhaust manifold above ground to control heated inflation liner 101 is ready for inflation and cure.

Air is first introduced into fluid inlet hose 126 to expand liner 101 against conduit 111. At this time air is changed over to steam without loss in pressure in liner 101 and cure of the resin in the impregnable layer begins to cure. At the end of the cure cycle and cure is complete the steam is changed back to air and liner 101 is allowed to cool. Once the temperature has cooled to a desired level, air flow pressure is reduced to zero the process is complete. It is then safe to enter installation manhole 113 and remove pulling head 102 and trim liner 101 at conduit 111. Similarly, receiving canister 116 is removed from receiving manhole 112 and liner 101 is trimmed. At this time cured liner 101 is ready for any lateral reinstatement.

It can readily be seen that the process in accordance with the invention readily allows one to attain the advantage of pull in and inflate and curing a liner having an inner impermeable layer with flow-through steam. By practicing the process, a tubular member can be easily pulled in and inflated using a pulling head that can be coupled to air for inflation and steam for curing while a pressure can be maintained within the liner by installing a receiving canister above ground. This process limits the need for man entry into underground access while utilizing the higher energy available in the steam to cure the resin significantly faster than one can cure utilizing circulating hot water.

It will thus be seen that the objects set forth above, among those made apparent from the preceding description, are efficiently attained and, since certain changes may be made in carrying out the above process, in the described product, and in the construction(s) set forth without departing from the spirit and scope of the invention, it is intended that all matter contained in the above description and shown in the accompanying drawing(s) shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for installing a resin impregnated cured in place liner having inner and outer resin impermeable coatings into an existing underground conduit from an installation access opening to a receiving access opening, comprising:

providing a length of liner suitable for the length of conduit to be repaired;
pulling the liner into the conduit from the receiving access opening towards the installation access opening to a predetermined distance from the end of the conduit at the installation access opening;
providing a receiving canister having an open installation end and a receiving end with a fluid outlet coupling;
installing the open end of the receiving canister into the trailing end of the liner;
continuing to pull the liner into the installation access opening so that the leading end of the liner is disposed in the installation access opening and the receiving canister is positioned at the end of the conduit at the receiving access opening;
connecting an inlet fluid supply line into the leading end of the liner in the installation access opening;
installing an exhaust line on the fluid outlet on the receiving canister;
feeding fluid into the liner to expand the liner against the wall of the conduit and pass through the liner and exit the exhaust line at the receiving access opening;
feeding heated fluid through the liner until the resin in the liner is cured;
cease feeding curing fluid; and
allowing the liner to cool.

2. The method of claim 1, including:
providing a hollow pull-in fitting having an installation end with a fluid coupling and an open second end; and
installing the receiving end of the pull-in fitting into the leading end of the liner.

3. The method of claim 1, including the steps of:
 inflating the liner with air; and
 curing the resin with steam.

4. The method of claim 1, including providing a continuous length of liner and cutting the liner when the liner is pulled into the predetermined distance from the installation access opening.

5. A method for installing a resin impregnated cured in place liner into an existing underground conduit, comprising:
 providing a length of liner;
 pulling the liner into the conduit;
 providing a receiving canister having an open installation end and a receiving end with at least one fluid outlet opening;
 installing the open end of the receiving canister at the trailing end of the liner;
 connecting an inlet fluid supply line into the leading end of the liner;
 installing an exhaust line on a fluid outlet opening on the receiving canister;
 feeding fluid into the liner to expand the liner against the wall of the conduit and pass through the liner and exit the exhaust line to cure the resin in the liner, and allowing the liner to cool.

6. The method of claim 5, including:
 providing a hollow pull-in fitting having an installation end with a fluid coupling and an open second end; and
 installing the receiving end of the pull-in fitting into the leading end of the liner.

7. The method of claim 6, comprising the step of feeding the fluid into the liner through the pull-in fitting.

8. The method of claim 5, including the steps of:
 inflating the liner with air; and
 curing the resin with steam.

9. The method of claim 1, including providing a continuous length of liner and cutting the liner when the liner is pulled into the predetermined distance.

10. The method of claim 5, wherein the liner is pulled into the existing conduit from an installation access opening to a receiving access opening.

11. The method of claim 5, including providing a continuous length of liner and cutting the liner when the liner is pulled into the predetermined distance.

12. A method for installing a resin impregnated cured in place liner into an existing underground conduit, comprising:
 providing a length of liner suitable for the length of conduit to be repaired;
 pulling the liner into the conduit a predetermined distance;
 providing a receiving canister having an open installation end and a receiving end with at least one fluid outlet opening;
 installing the open end of the receiving canister at the trailing end of the liner;
 continuing to pull the liner into the conduit;
 connecting an inlet fluid supply line into the leading end of the liner;
 installing an exhaust line on a fluid outlet opening on the receiving canister;
 feeding fluid into the liner to expand the liner against the wall of the conduit and pass through the liner and exit the exhaust line;
 feeding heated fluid through the liner until the resin in the liner is cured;
 cease feeding curing fluid; and allowing the line to cool.

13. The method of claim 12, including:
 providing a hollow pull-in fitting having an installation end with a fluid coupling and an open second end; and
 installing the receiving end of the pull-in fitting into the leading end of the liner.

14. The method of claim 13, comprising the step of feeding the fluid into the liner through the pull-in fitting.

15. The method of claim 12, including the steps of:
 inflating the liner with air; and
 curing the resin with steam.

16. The method of claim 12, including providing a continuous length of liner and cutting the liner when the liner is pulled into the predetermined distance.

17. The method of claims 15, wherein the liner is pulled into the existing conduit from an installation access opening to a receiving access opening.

* * * * *